US011012711B2

(12) United States Patent
Xu et al.

(10) Patent No.: US 11,012,711 B2
(45) Date of Patent: *May 18, 2021

(54) ADAPTIVE MOST PROBABLE MODES FOR MULTIPLE REFERENCE LINE INTRA PREDICTION

(71) Applicant: TENCENT AMERICA LLC, Palo Alto, CA (US)

(72) Inventors: Xiaozhong Xu, State College, PA (US); Shan Liu, San Jose, CA (US); Yingbin Wang, Wuhan (CN); Zhenzhong Chen, Wuhan (CN)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,739

(22) Filed: Nov. 20, 2019

(65) Prior Publication Data
US 2020/0177914 A1 Jun. 4, 2020

Related U.S. Application Data

(60) Provisional application No. 62/787,040, filed on Dec. 31, 2018, provisional application No. 62/773,147, filed on Nov. 29, 2018.

(51) Int. Cl.
*H04N 19/593* (2014.01)
*H04N 19/176* (2014.01)
(Continued)

(52) U.S. Cl.
CPC ......... *H04N 19/593* (2014.11); *H04N 19/176* (2014.11); *H04N 19/198* (2014.11); *H04N 19/96* (2014.11)

(58) Field of Classification Search
None
See application file for complete search history.

(56) References Cited

U.S. PATENT DOCUMENTS

| 10,419,754 B1 * | 9/2019 | Zhao ............... H04N 19/176 |
| 2013/0044812 A1 | 2/2013 | Ye et al. |

(Continued)

FOREIGN PATENT DOCUMENTS

EP    3562158 A1 * 10/2019    ........... H04N 19/197

OTHER PUBLICATIONS

International Search Report dated Feb. 3, 2020 from the International Searching Authority in International Application No. PCT/US2019/063231.
(Continued)

*Primary Examiner* — Tyler W. Sullivan
(74) *Attorney, Agent, or Firm* — Sughrue Mion, PLLC

(57) ABSTRACT

A method of controlling intra prediction for decoding or encoding of a video sequence, is performed by at least one processor and includes identifying whether a first intra prediction mode of an above neighboring block of a prediction block is different than a second intra prediction mode of a left neighboring block of the prediction block. The method further includes, based on the first intra prediction mode being identified to be not different than the second intra prediction mode, obtaining a most probable mode (MPM) list including the first intra prediction mode, first immediate modes immediate to the first intra prediction mode and one among second immediate modes respectively immediate to the first immediate modes, and performing the intra prediction on multiple reference lines of the prediction block, using the obtained MPM list, the multiple reference lines being without a first reference line closest to the prediction block.

15 Claims, 18 Drawing Sheets

(51) Int. Cl.
*H04N 19/96* (2014.01)
*H04N 19/196* (2014.01)

(56) References Cited

U.S. PATENT DOCUMENTS

| | | | |
|---|---|---|---|
| 2014/0307787 A1 | 10/2014 | Zheng et al. | |
| 2018/0098064 A1* | 4/2018 | Seregin | H04N 19/463 |
| 2018/0332284 A1* | 11/2018 | Liu | H04N 19/182 |
| 2019/0158828 A1* | 5/2019 | Chang | H04N 19/11 |
| 2019/0281290 A1* | 9/2019 | Lee | H04N 19/105 |
| 2020/0014920 A1* | 1/2020 | Zhao | H04N 19/11 |
| 2020/0092544 A1* | 3/2020 | Zhao | H04N 19/103 |
| 2020/0137401 A1* | 4/2020 | Kim | H04N 19/619 |
| 2020/0169752 A1* | 5/2020 | Rath | H04N 19/11 |
| 2020/0177886 A1* | 6/2020 | Zhao | H04N 19/593 |
| 2020/0204798 A1* | 6/2020 | Li | H04N 19/132 |
| 2020/0228798 A1* | 7/2020 | Zhao | H04N 19/159 |
| 2020/0244956 A1* | 7/2020 | Lee | H04N 19/186 |
| 2020/0267382 A1* | 8/2020 | Li | H04N 19/46 |

OTHER PUBLICATIONS

Written Opinion dated Feb. 3, 2020 from the International Searching Authority in International Application No. PCT/US2019/063231.

* cited by examiner

--Prior Art--

--Prior Art--

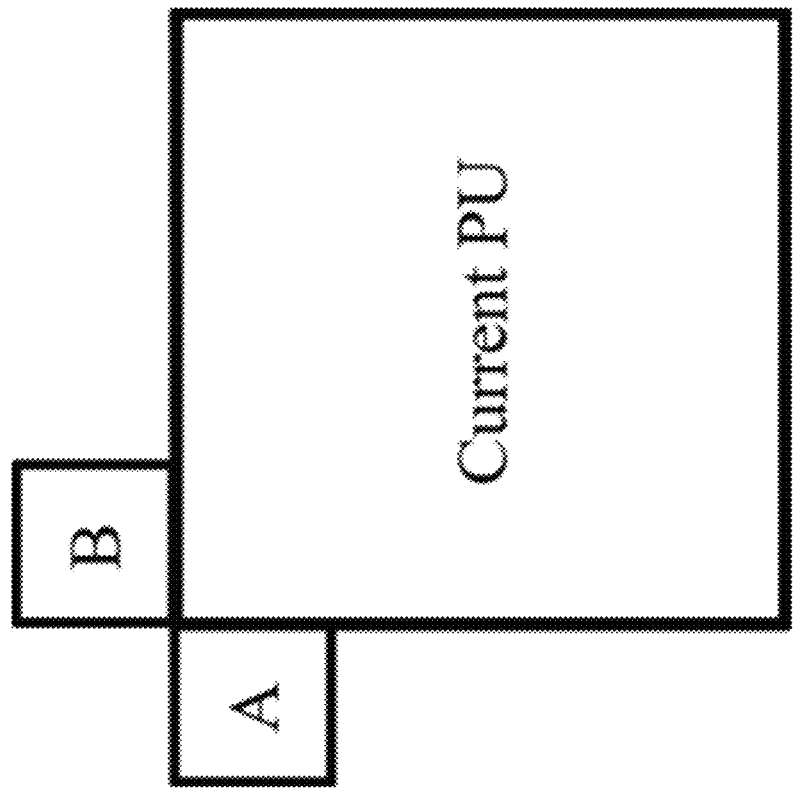

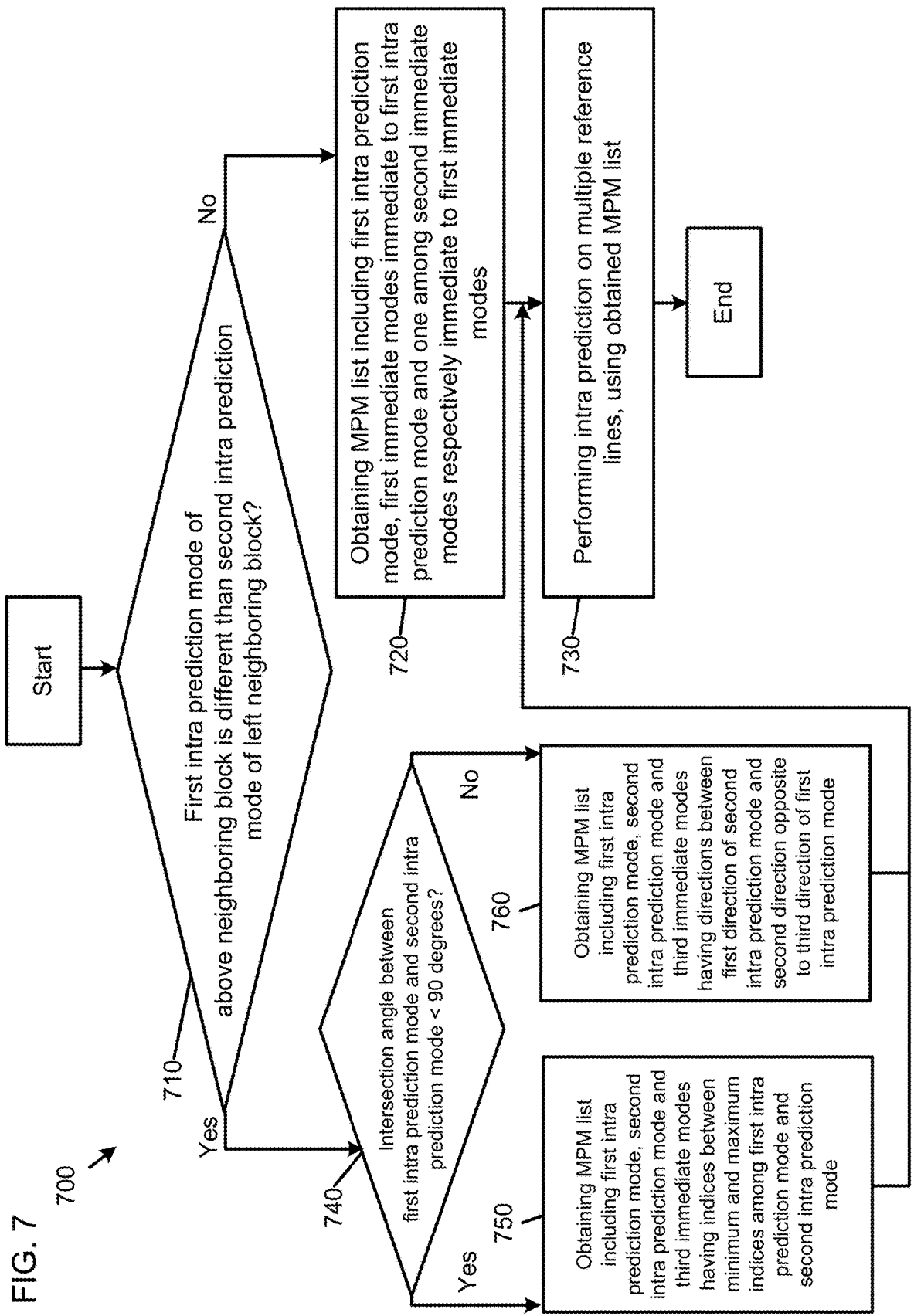

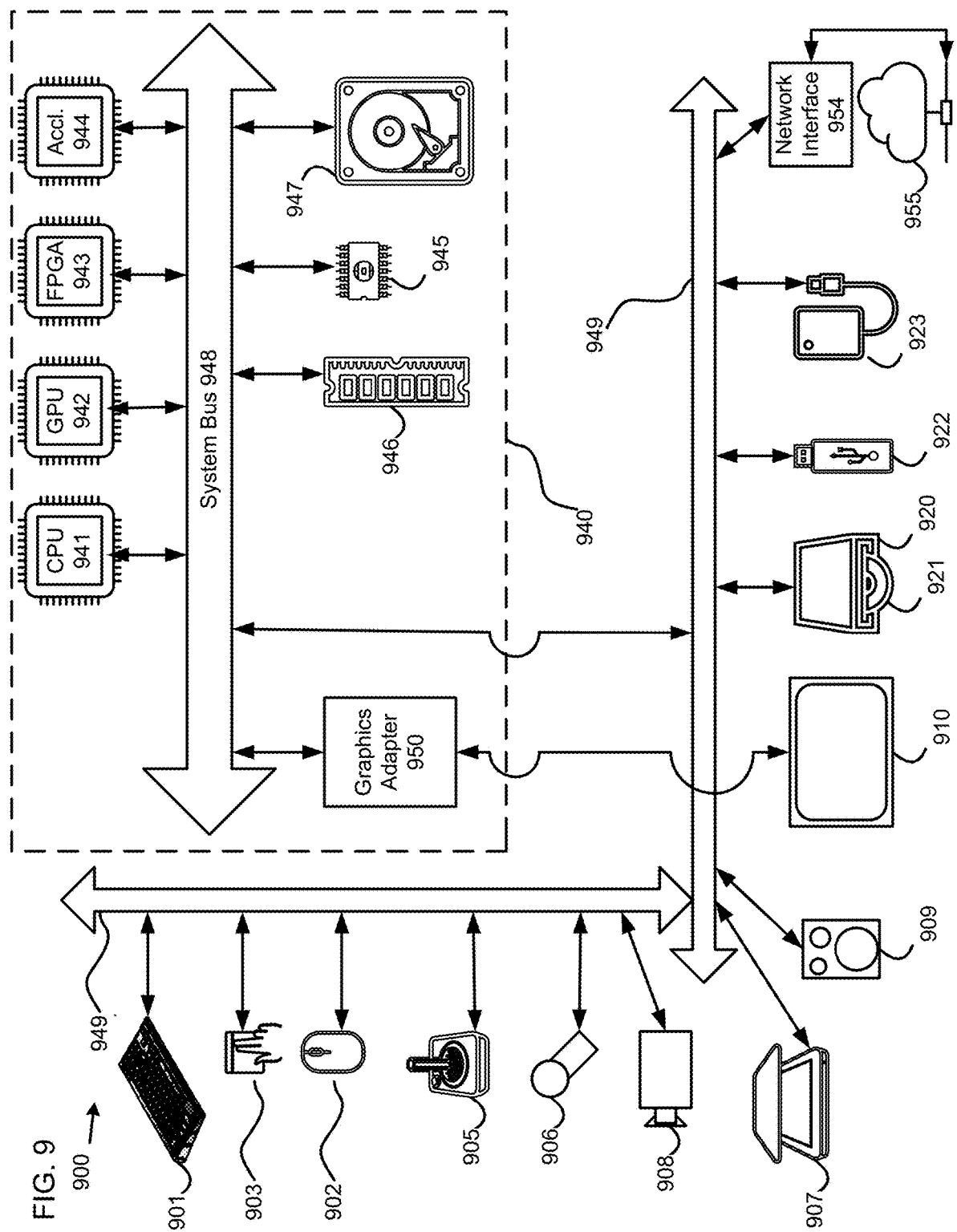

ADAPTIVE MOST PROBABLE MODES FOR MULTIPLE REFERENCE LINE INTRA PREDICTION

CROSS-REFERENCE TO RELATED APPLICATION

This application claims priority from U.S. Provisional Patent Application No. 62/773,147, filed on Nov. 29, 2018, in the U.S. Patent and Trademark Office, and U.S. Provisional Patent Application No. 62/787,040, filed on Dec. 31, 2018, in the U.S. Patent and Trademark Office, which are incorporated herein by reference in their entireties.

BACKGROUND

1. Field

Methods and apparatuses consistent with embodiments relate to video coding, and more particularly, adaptive most probable modes for multiple reference line intra prediction.

2. Description of Related Art

In block-based hybrid video coding, each picture is partitioned into blocks of samples, and multiple blocks within a picture are aggregated to form slices as independently decodable entities. For block-based video coding, a picture may be partitioned into several blocks, which may also be referred to as coding tree units (CTUs), coding units (CUs), and/or coding blocks (CBs).

FIG. 1A shows an example of a partitioning structure of High Efficiency Video Coding (HEVC). HEVC employs a quad-tree coding block partitioning structure that enables a flexible use of large and small coding, prediction, and transform blocks.

Intra-prediction is a video coding technique to reduce or remove spatial redundancy inherent in video sequences. Video blocks in an intra-coded picture are encoded using spatial prediction with respect to reference samples in neighboring blocks in the same picture. In HEVC, the intra prediction processes and provides 35 modes (Planar, DC and 33 angular directions) for a luma of each prediction unit (PU), one of which is selected according to the intra prediction mode of a prediction block (PB). Mode-dependent reference and prediction sample smoothing is applied to increase prediction efficiency, and an intra prediction mode is coded using either one of three most probable modes (MPMs) or one of 32 remaining modes. A mapping between the direction of each of the angular intra prediction modes and an intra prediction mode number is specified in FIG. 1B.

Multiple reference line (MRL) intra prediction was proposed to use more reference lines for intra prediction. An index of a selected reference line is signaled and used to generate an intra predictor. The reference line index is signaled before intra prediction modes and Planar and DC modes are excluded from intra prediction modes in case in which a nonzero reference line index is signaled. In FIG. 1C, an example of 4 reference lines is depicted, where samples of segments A and F are not fetched from reconstructed neighbouring samples but padded with closest samples from Segment B and E, respectively.

Intra prediction processes in HEVC provide 35 modes (Planar, DC and 33 angular directions) for a luma of each PU, one of which is selected according to the intra prediction mode of a prediction block. An encoder selects an intra prediction mode for a PU as follows. First, a candidate mode derivation step tests all possible prediction modes for a luma PB with an approximate prediction cost. A predetermined number of intermediate candidates are found for each PU size. Then a rate distortion (RD) optimization step using a coding cost is applied to previous candidate modes to decide an optimal prediction mode.

An intra mode coding method with 3 Most Probable Modes (MPMs) is used in HEVC for coding intra prediction modes. MPMs indicate the most probable modes that will be used for intra prediction. Entries in an MPM list are derived by prediction modes in neighboring blocks, i.e., block A and B in FIG. 1D. Intra prediction mode is coded using either one of the three MPMs or one of the 32 remaining modes. For entropy coding of the 32 non-MPM modes, a 5-bit Fixed Length Code (FLC) is used.

SUMMARY

According to embodiments, a method of controlling intra prediction for decoding or encoding of a video sequence, is performed by at least one processor and includes identifying whether a first intra prediction mode of an above neighboring block of a prediction block is different than a second intra prediction mode of a left neighboring block of the prediction block. The method further includes, based on the first intra prediction mode being identified to be not different than the second intra prediction mode, obtaining a most probable mode (MPM) list including the first intra prediction mode, first immediate modes immediate to the first intra prediction mode and one among second immediate modes respectively immediate to the first immediate modes, and performing the intra prediction on multiple reference lines of the prediction block, using the obtained MPM list, the multiple reference lines being without a first reference line closest to the prediction block.

According to embodiments, an apparatus for controlling intra prediction for decoding or encoding of a video sequence, includes at least one memory configured to store computer program code, and at least one processor configured to access the at least one memory and operate according to the computer program code. The computer program code includes first identifying code configured to cause the at least one processor to identify whether a first intra prediction mode of an above neighboring block of a prediction block is different than a second intra prediction mode of a left neighboring block of the prediction block, and obtaining code configured to cause the at least one processor to, based on the first intra prediction mode being identified to be not different than the second intra prediction mode, obtain a most probable mode (MPM) list including the first intra prediction mode, first immediate modes immediate to the first intra prediction mode and one among second immediate modes respectively immediate to the first immediate modes. The computer program code further includes performing code configured to cause the at least one processor to perform the intra prediction on multiple reference lines of the prediction block, using the obtained MPM list, the multiple reference lines being without a first reference line closest to the prediction block.

According to embodiments, a non-transitory computer-readable storage medium stores instructions that cause at least one processor to identify whether a first intra prediction mode of an above neighboring block of a prediction block is different than a second intra prediction mode of a left neighboring block of the prediction block, and based on the first intra prediction mode being identified to be not different than the second intra prediction mode, obtain a most probable mode (MPM) list including the first intra prediction mode, first immediate modes immediate to the first intra prediction mode and one among second immediate modes respectively immediate to the first immediate modes. The instructions further cause the at least one processor to perform intra prediction on multiple reference lines of the prediction block, using the obtained MPM list, the multiple reference lines being without a first reference line closest to the prediction block.

BRIEF DESCRIPTION OF THE DRAWINGS

FIG. 1D is a diagram of most probable modes in HEVC.

FIG. 7 is a flowchart illustrating a method of controlling intra prediction for decoding or encoding of a video sequence, according to embodiments.

FIG. 9 is a diagram of a computer system suitable for implementing embodiments.

DETAILED DESCRIPTION

Figure 1B:
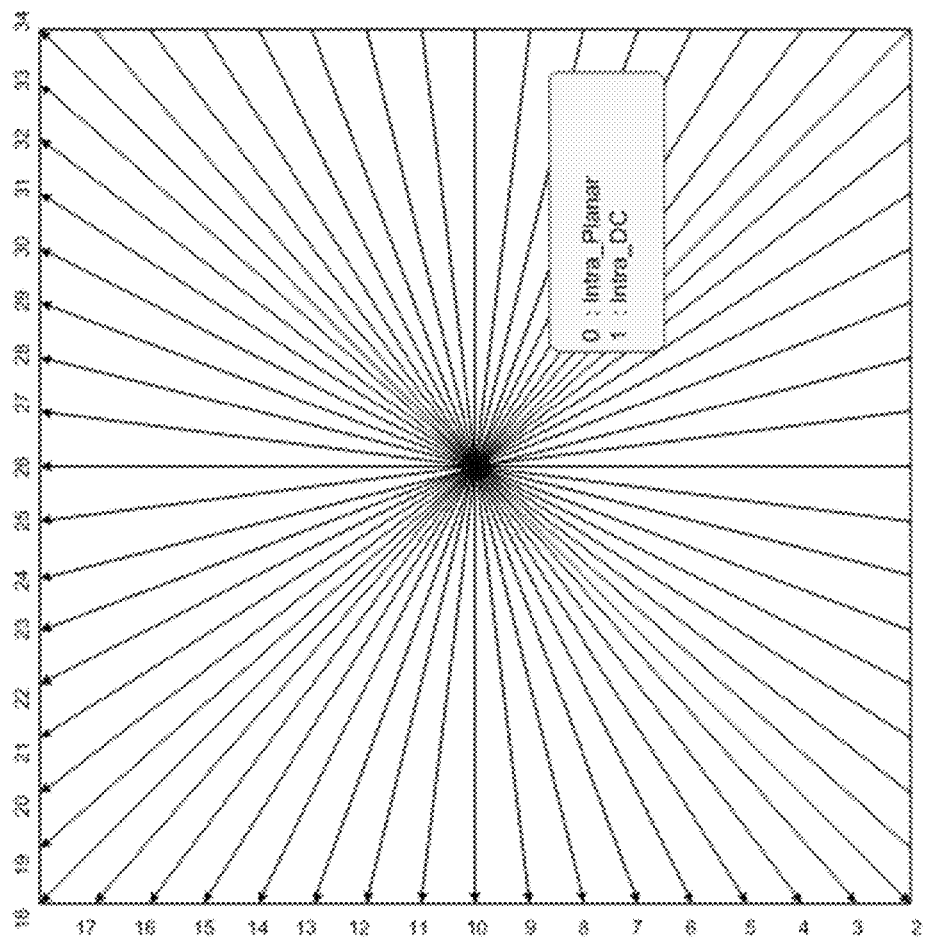
FIG. 1B is a diagram of mapping between intra prediction directions and intra prediction modes in HEVC.
Figure 1A:
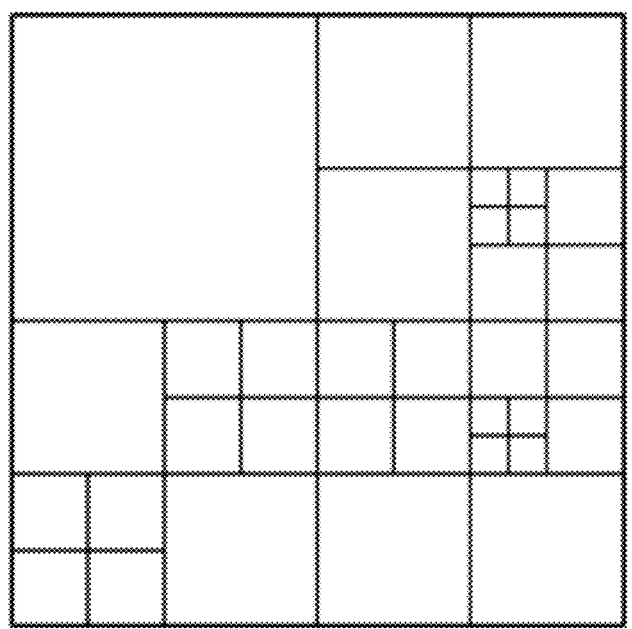
FIG. 1A is a diagram of a partitioning structure in HEVC.
Figure 1C:
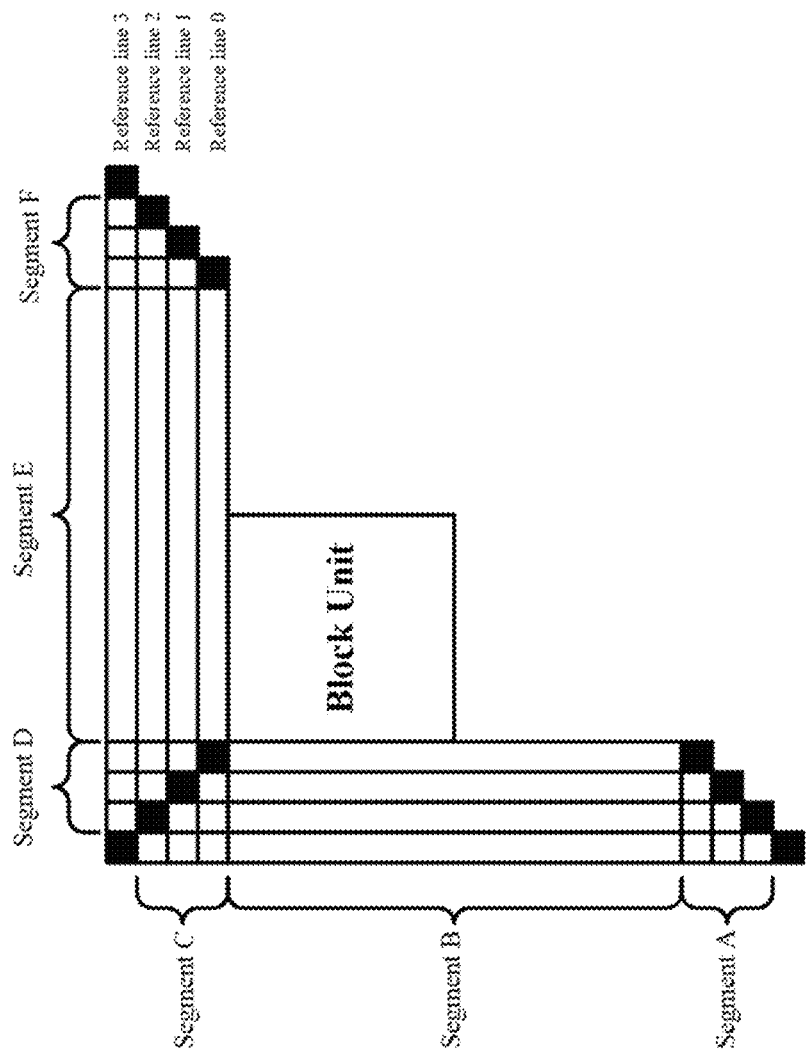
FIG. 1C is a diagram of four reference lines neighboring a prediction block unit.
Figure 2:
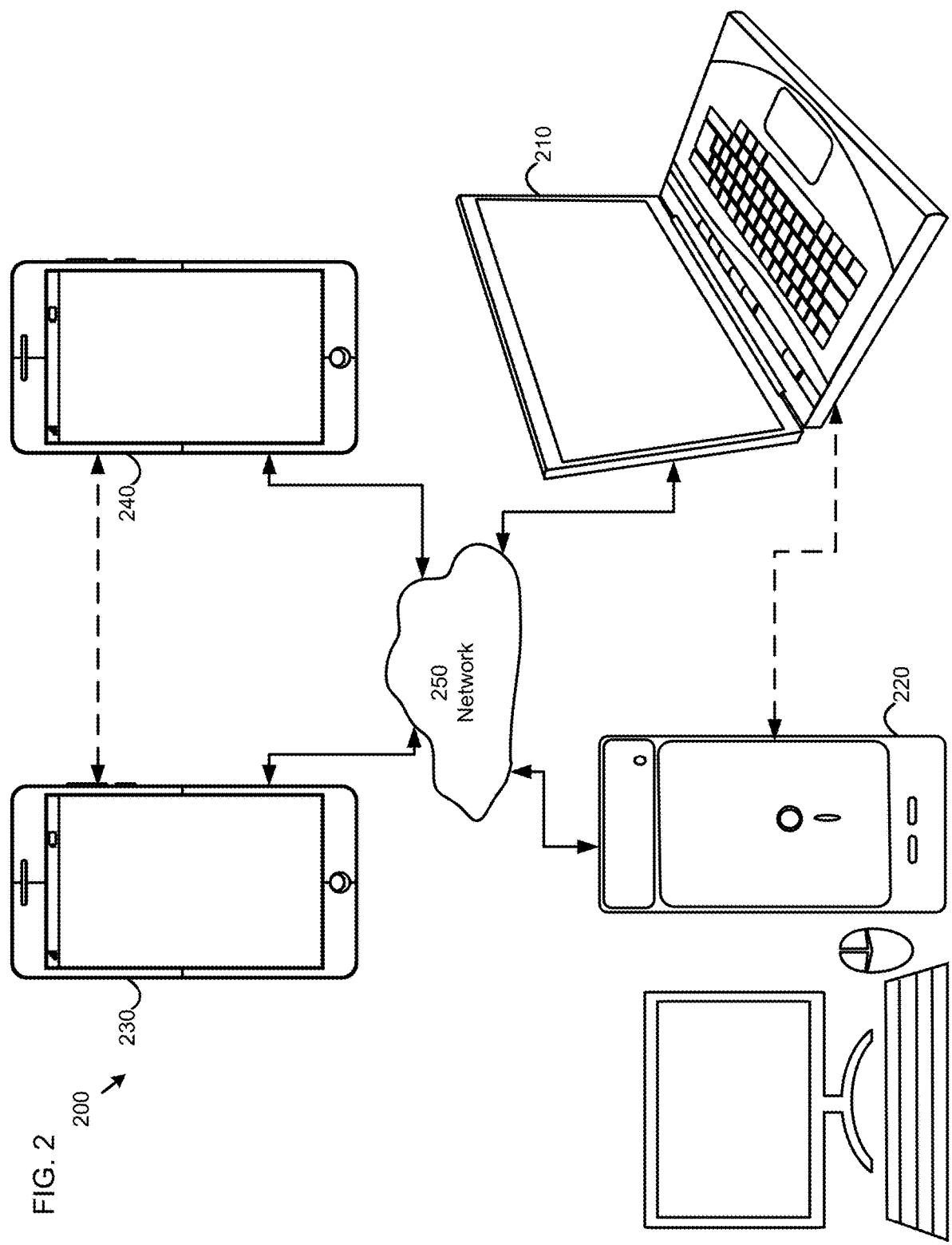
FIG. 2 is a simplified block diagram of a communication system according to embodiments.

FIG. 2 is a simplified block diagram of a communication system (200) according to embodiments. The communication system (200) may include at least two terminals (210-220) interconnected via a network (250). For unidirectional transmission of data, a first terminal (210) may code video data at a local location for transmission to the other terminal (220) via the network (250). The second terminal (220) may receive the coded video data of the other terminal from the network (250), decode the coded data and display the recovered video data. Unidirectional data transmission may be common in media serving applications and the like.

FIG. 2 illustrates a second pair of terminals (230, 240) provided to support bidirectional transmission of coded video that may occur, for example, during video conferencing. For bidirectional transmission of data, each terminal (230, 240) may code video data captured at a local location for transmission to the other terminal via the network (250). Each terminal (230, 240) also may receive the coded video data transmitted by the other terminal, may decode the coded data and may display the recovered video data at a local display device.

In FIG. 2, the terminals (210-240) may be illustrated as servers, personal computers and smart phones but the principles of embodiments are not so limited. Embodiments find application with laptop computers, tablet computers, media players and/or dedicated video conferencing equipment. The network (250) represents any number of networks that convey coded video data among the terminals (210-240), including for example wireline and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of embodiments unless explained herein below.

Figure 3:
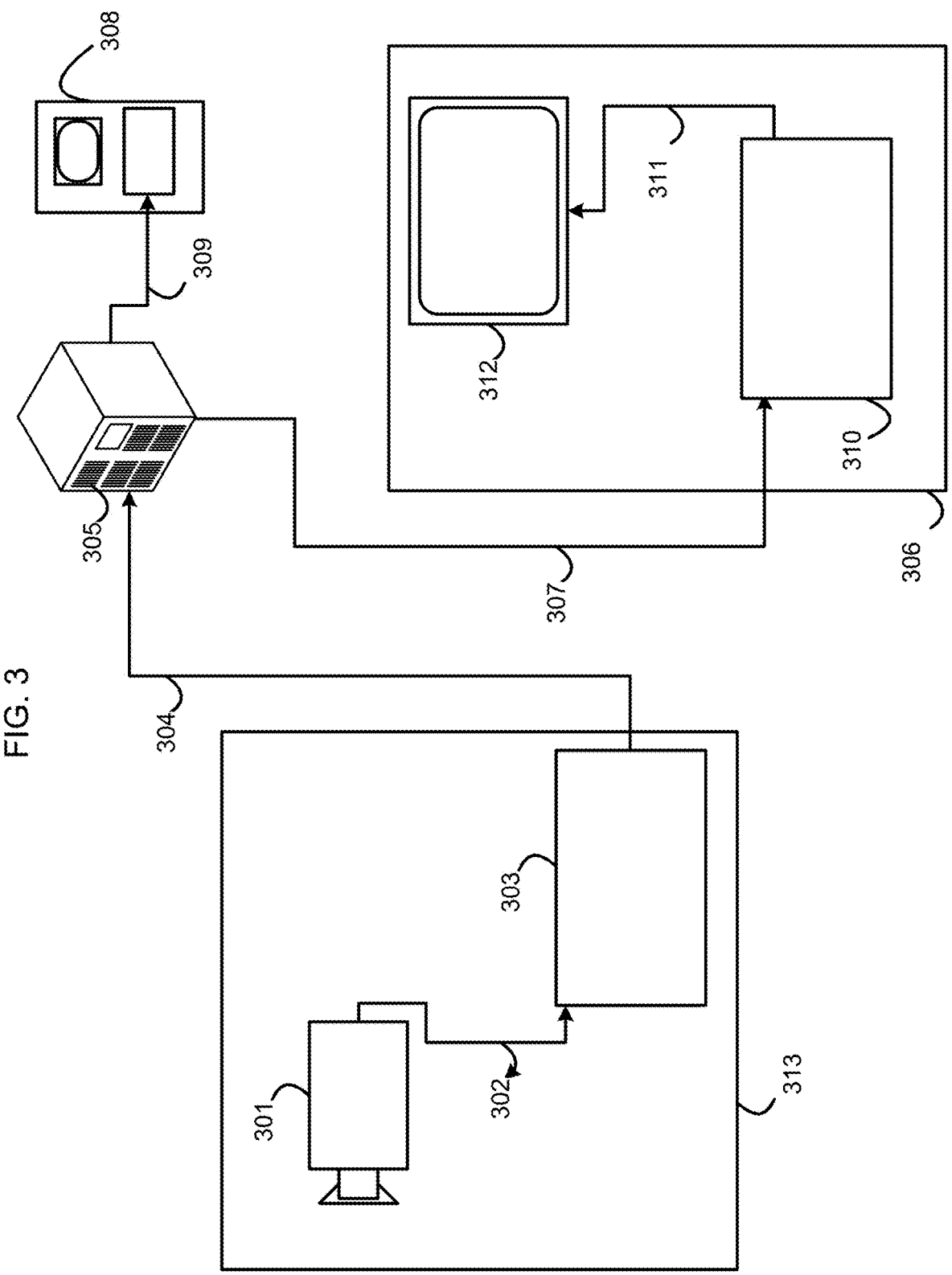
FIG. 3 is a diagram of a placement of a video encoder and a video decoder in a streaming environment, according to embodiments.

FIG. 3 is a diagram of a placement of a video encoder and a video decoder in a streaming environment, according to embodiments. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313) that can include a video source (301), for example a digital camera, creating, for example, an uncompressed video sample stream (302). That sample stream (302), depicted as a bold line to emphasize a high data volume when compared to encoded video bitstreams, can be processed by an encoder (303) coupled to the camera (301). The encoder (303) can include hardware, software, or a combination thereof to enable or implement aspects of the disclosed subject matter as described in more detail below. The encoded video bitstream (304), depicted as a thin line to emphasize the lower data volume when compared to the sample stream, can be stored on a streaming server (305) for future use. One or more streaming clients (306, 308) can access the streaming server (305) to retrieve copies (307, 309) of the encoded video bitstream (304). A client (306) can include a video decoder (310), which decodes the incoming copy of the encoded video bitstream (307) and creates an outgoing video sample stream (311) that can be rendered on a display (312) or other rendering device (not depicted). In some streaming systems, the video bitstreams (304, 307, 309) can be encoded according to certain video coding/compression standards. Examples of those standards include ITU-T Recommendation H.265. Under development is a video coding standard informally known as VVC. The disclosed subject matter may be used in the context of VVC.

Figure 4:
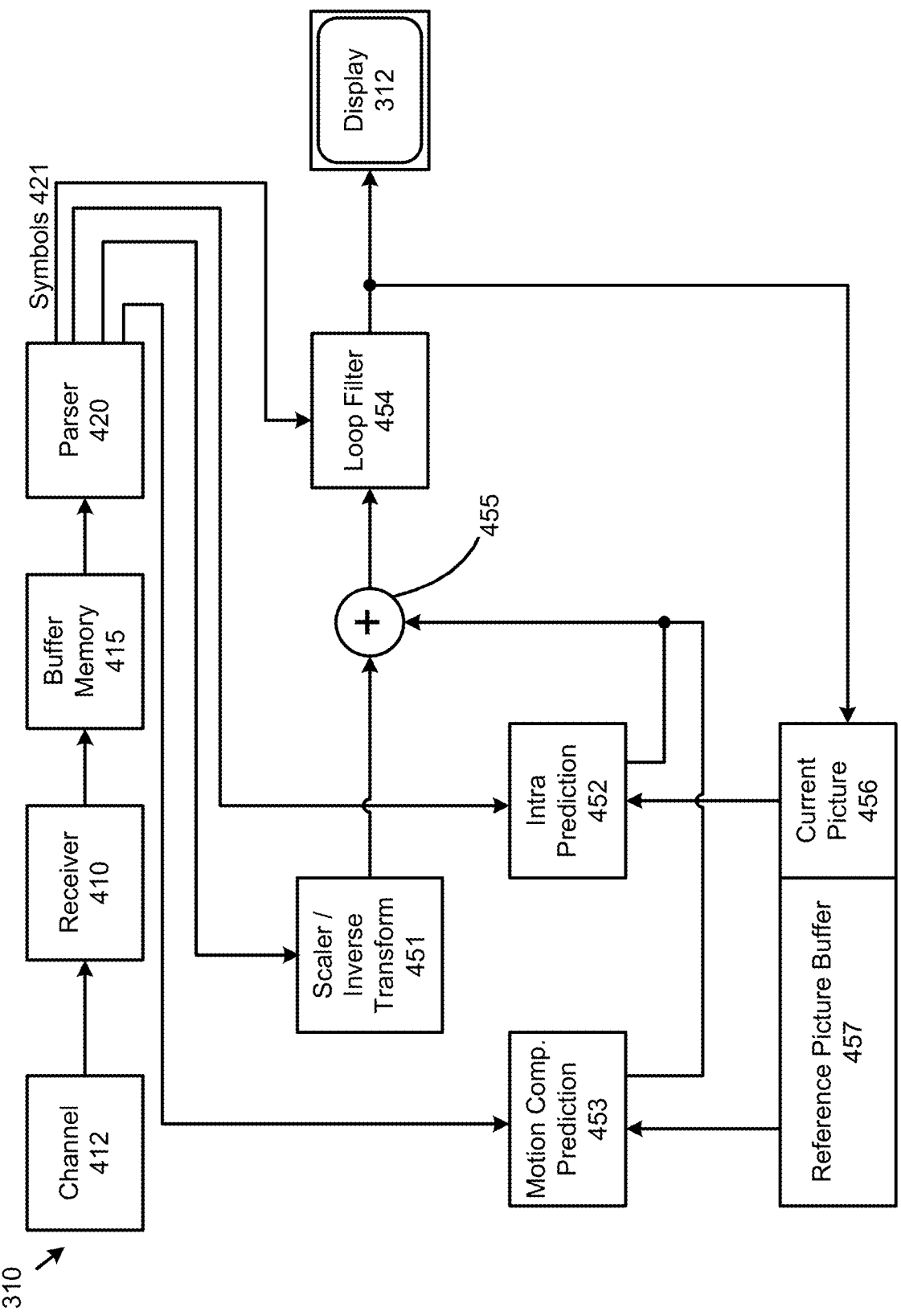
FIG. 4 is a functional block diagram of a video decoder according to embodiments.

FIG. 4 is a functional block diagram of a video decoder (310) according to embodiments.

A receiver (410) may receive one or more codec video sequences to be decoded by the decoder (310); in the same or embodiments, one coded video sequence at a time, where the decoding of each coded video sequence is independent from other coded video sequences. The coded video sequence may be received from a channel (412), which may be a hardware/software link to a storage device, which stores the encoded video data. The receiver (410) may receive the encoded video data with other data, for example, coded audio data and/or ancillary data streams, that may be forwarded to their respective using entities (not depicted). The receiver (410) may separate the coded video sequence from the other data. To combat network jitter, a buffer memory (415) may be coupled in between receiver (410) and entropy decoder/parser (420) ("parser" henceforth). When receiver (410) is receiving data from a store/forward device of sufficient bandwidth and controllability, or from an isosychronous network, the buffer (415) may not be needed, or can be small. For use on best effort packet networks such as the Internet, the buffer (415) may be required, can be comparatively large and can advantageously of adaptive size.

The video decoder (310) may include a parser (420) to reconstruct symbols (421) from the entropy coded video sequence. Categories of those symbols include information used to manage operation of the decoder (310), and potentially information to control a rendering device such as a display (312) that is not an integral part of the decoder but can be coupled to it, as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The entropy decoder/parser may also extract from the coded video sequence information such as transform coefficients, quantizer parameter (QP) values, motion vectors, and so forth.

The parser (420) may perform entropy decoding/parsing operation on the video sequence received from the buffer (415), so to create symbols (421). The parser (420) may receive encoded data, and selectively decode particular symbols (421). Further, the parser (420) may determine whether the particular symbols (421) are to be provided to a Motion Compensation Prediction unit (453), a scaler/inverse transform unit (451), an Intra Prediction unit (452), or a loop filter unit (454).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, decoder (310) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives quantized transform coefficient as well as control information, including which transform to use, block size, quantization factor, quantization scaling matrices, etc. as symbol(s) (421) from the parser (420). It can output blocks comprising sample values that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current (partly reconstructed) picture (456). The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a Motion Compensation Prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (421) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (455) can be subject to various loop filtering techniques in the loop filter unit (454). Video compression technologies can include in-loop filter technologies that are controlled by parameters included in the coded video bitstream and made available to the loop filter unit (454) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (454) can be a sample stream that can be output to the render device (312) as well as stored in the reference picture memory (456) for use in future inter-picture prediction.

Certain coded pictures, once fully reconstructed, can be used as reference pictures for future prediction. Once a coded picture is fully reconstructed and the coded picture has been identified as a reference picture (by, for example, parser (420)), the current reference picture (456) can become part of the reference picture buffer (457), and a fresh current picture memory can be reallocated before commencing the reconstruction of the following coded picture.

The video decoder (310) may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In embodiments, the receiver (410) may receive additional (redundant) data with the encoded video. The additional data may be included as part of the coded video sequence(s). The additional data may be used by the video decoder (310) to properly decode the data and/or to more accurately reconstruct the original video data. Additional data can be in the form of, for example, temporal, spatial, or signal-to-noise ratio (SNR) enhancement layers, redundant slices, redundant pictures, forward error correction codes, and so on.

Figure 5:
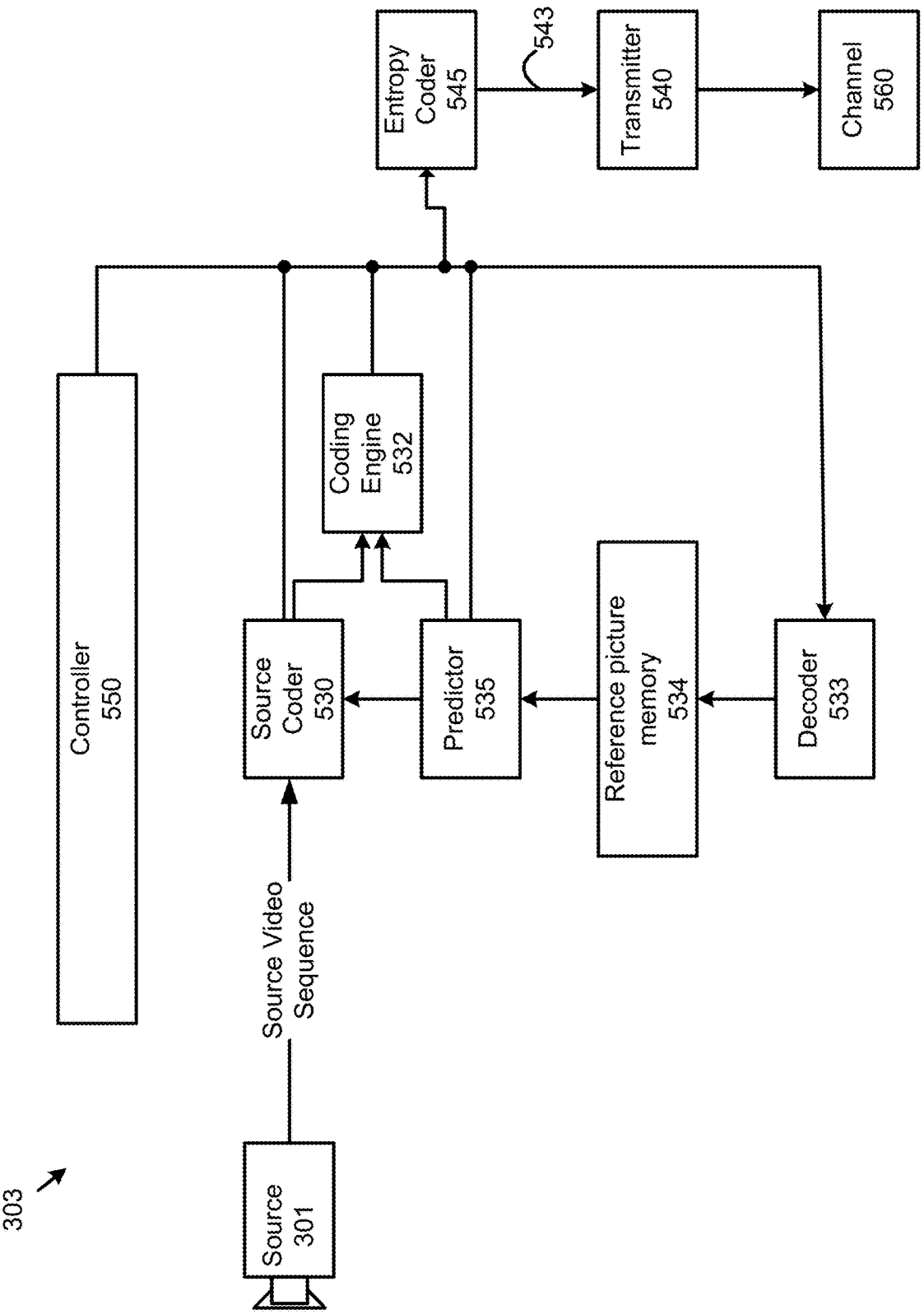
FIG. 5 is a functional block diagram of a video encoder according to embodiments.

FIG. 5 is a functional block diagram of a video encoder (303) according to embodiments.

The encoder (303) may receive video samples from a video source (301) (that is not part of the encoder) that may capture video image(s) to be coded by the encoder (303).

The video source (301) may provide the source video sequence to be coded by the encoder (303) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to embodiments, the encoder (303) may code and compress the pictures of the source video sequence into a coded video sequence (543) in real time or under any other time constraints as required by the application. Enforcing appropriate coding speed is one function of controller (550). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (550) as they may pertain to video encoder (303) optimized for a certain system design.

Some video encoders operate in what a person skilled in the art readily recognizes as a "coding loop." As an oversimplified description, a coding loop can consist of the encoding part of an encoder (530) ("source coder" henceforth) (responsible for creating symbols based on an input picture to be coded, and a reference picture(s)), and a (local) decoder (533) embedded in the encoder (303) that reconstructs the symbols to create the sample data that a (remote) decoder also would create (as any compression between symbols and coded video bitstream is lossless in the video compression technologies considered in the disclosed subject matter). That reconstructed sample stream is input to the reference picture memory (534). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (533) can be the same as of a "remote" decoder (310), which has already been described in detail above in conjunction with FIG. 4. Briefly referring also to FIG. 4, however, as symbols are available and en/decoding of symbols to a coded video sequence by entropy coder (545) and parser (420) can be lossless, the entropy decoding parts of decoder (310), including channel (412), receiver (410), buffer (415), and parser (420) may not be fully implemented in local decoder (533).

An observation that can be made at this point is that any decoder technology except the parsing/entropy decoding that is present in a decoder also necessarily needs to be present, in substantially identical functional form, in a corresponding encoder. The description of encoder technologies can be abbreviated as they are the inverse of the comprehensively described decoder technologies. Only in certain areas a more detail description is required and provided below.

As part of its operation, the source coder (530) may perform motion compensated predictive coding, which codes an input frame predictively with reference to one or more previously-coded frames from the video sequence that were designated as "reference frames." In this manner, the coding engine (532) codes differences between pixel blocks of an input frame and pixel blocks of reference frame(s) that may be selected as prediction reference(s) to the input frame.

The local video decoder (533) may decode coded video data of frames that may be designated as reference frames, based on symbols created by the source coder (530). Operations of the coding engine (532) may advantageously be lossy processes. When the coded video data may be decoded at a video decoder (not shown in FIG. 4), the reconstructed video sequence typically may be a replica of the source video sequence with some errors. The local video decoder (533) replicates decoding processes that may be performed by the video decoder on reference frames and may cause reconstructed reference frames to be stored in the reference picture cache (534). In this manner, the encoder (303) may store copies of reconstructed reference frames locally that have common content as the reconstructed reference frames that will be obtained by a far-end video decoder (absent transmission errors).

The predictor (535) may perform prediction searches for the coding engine (532). That is, for a new frame to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the video coder (530), including, for example, setting of parameters and subgroup parameters used for encoding the video data.

Output of all aforementioned functional units may be subjected to entropy coding in the entropy coder (545). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare it for transmission via a communication channel (560), which may be a hardware/software link to a storage device that may store the encoded video data. The transmitter (540) may merge coded video data from the video coder (530) with other data to be transmitted, for example, coded audio data and/or ancillary data streams (sources not shown).

The controller (550) may manage operation of the encoder (303). During coding, the controller (550) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder (303) may perform coding operations according to a predetermined video coding technology or standard, such as ITU-T Rec. H.265. In its operation, the video coder (303) may perform various compression operations, including predictive coding operations that exploit temporal and spatial redundancies in the input video sequence. The coded video data, therefore, may conform to a syntax specified by the video coding technology or standard being used.

In embodiments, the transmitter (540) may transmit additional data with the encoded video. The video coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

For a trade-off between complexity and performance, only modes in an MPM list are generally allowed for multiple reference line (MRL) intra prediction. A number of MPM modes restricts an accuracy of MRL intra prediction. Thus, embodiments described herein include adding more MPM modes for only MRL intra prediction by separating an MPM list of non-line 0 most probable modes (Non-L0MPMs) that are for only MRL intra prediction, from a common MPM list of line 0 most probable modes (L0MPMs) that are designed for intra prediction of a closest reference line 0.

A number of the Non-L0MPMs may not be exactly 4 directional modes. Further, the embodiments do not apply to only intra prediction with 33 angular directions or its variations/subsets, but also to other systems with a different number of angular directions. For example, the embodiments may be applied to intra prediction with 65 angular directions or its variations/subsets. An index of each angular direction may be different in different intra prediction systems.

In embodiments, as a direct extension of the above, the MPM list for only the MRL intra prediction can also be applied to intra prediction of the closest reference line 0.

The Non-L0MPMs can be generated or derived according to prediction directions of neighboring blocks. The Non-L0MPMs that include 4 entries can be derived as follows.

In embodiments, when intra prediction modes of above and left neighboring blocks of a current prediction block are unavailable, not coded in intra prediction modes, or are non-angular modes, only default modes having horizontal, vertical and/or diagonal directions are included in the most probable mode list for only MRL intra prediction, as described below.

Figure 6A:
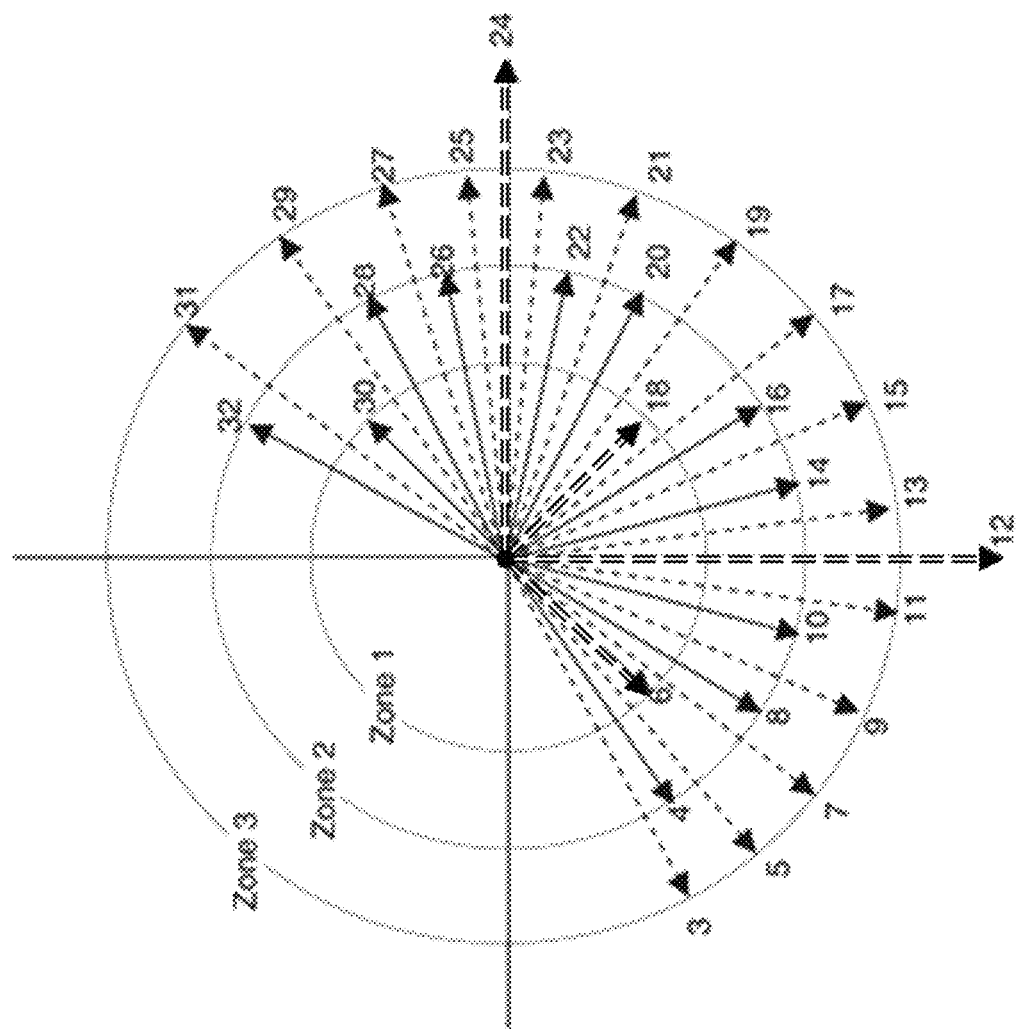
FIGS. 6A and 6B are diagrams of four Non-L0MPMs including default modes, according to embodiments.

FIG. 6A is a diagram of four Non-L0MPMs including default modes, according to embodiments.

Referring to FIG. 6A, intra prediction modes of a vertical direction (mode 12), a horizontal direction (mode 24), and diagonal directions (mode 18 and mode 6) are included in the most probable mode list for only the MRL intra prediction, as shown with double dotted line arrows.

Figure 6B:
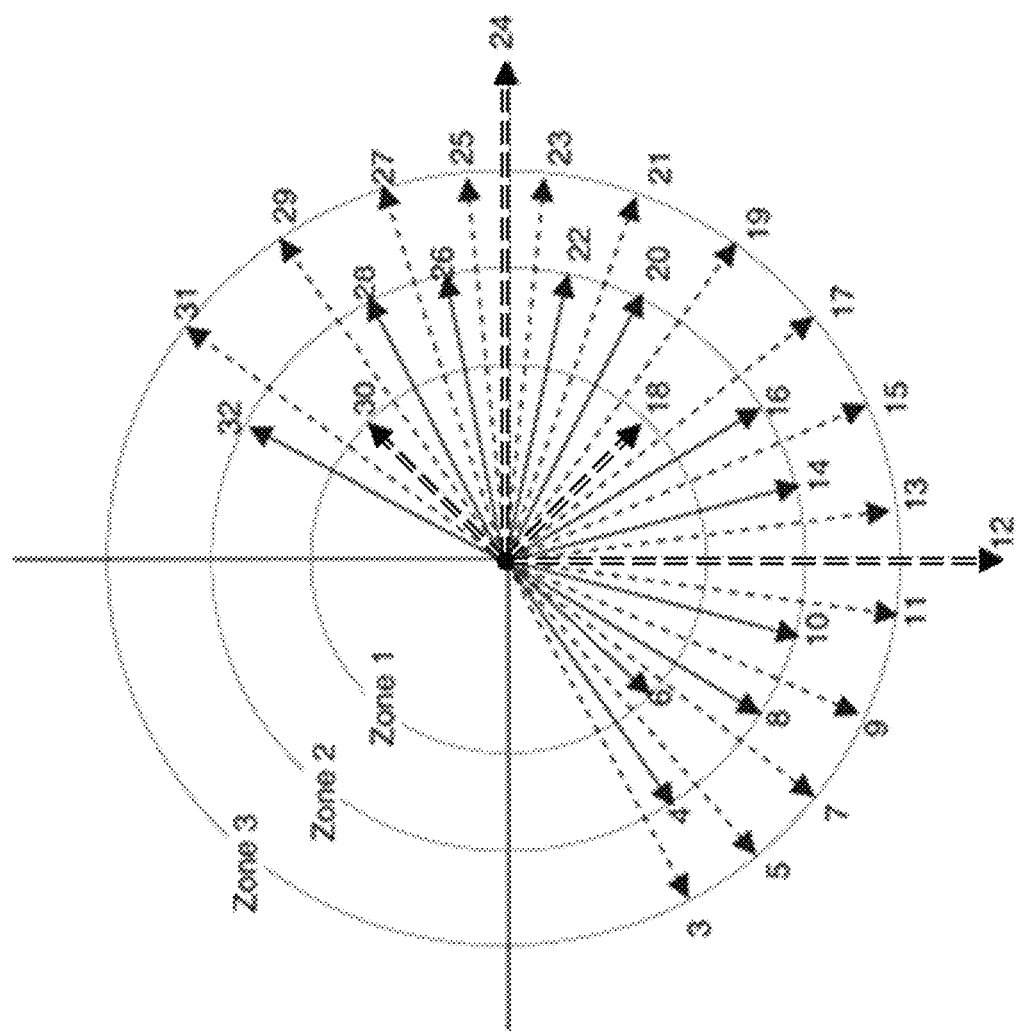

FIG. 6B is a diagram of four Non-L0MPMs including default modes, according to embodiments.

Referring to FIG. 6B, intra prediction modes of a vertical direction (mode 12), a horizontal direction (mode 24), and diagonal directions (mode 18 and mode 30) are included in the most probable mode list for only the MRL intra prediction, as shown with double dotted line arrows.

In embodiments, when intra prediction modes of above and left neighboring block are the same angular mode, only immediate and second immediate modes of this same angular mode are included in the most probable mode list for only MRL intra prediction, as described below.

Figure 6C:
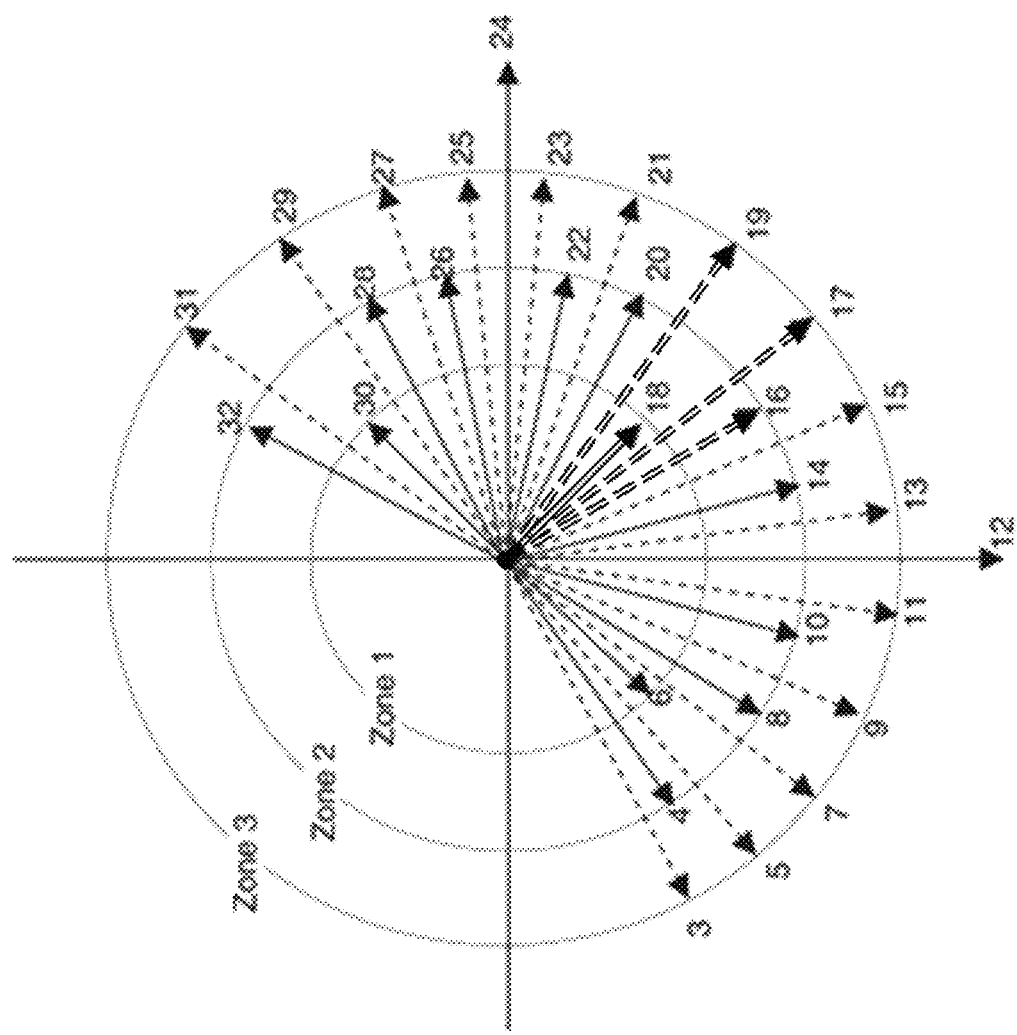
FIGS. 6C and 6D are diagrams of four Non-L0MPMs including an available angular mode and its immediate modes, according to embodiments.

FIG. 6C is a diagram of four Non-L0MPMs including an available angular mode and its immediate modes, according to embodiments.

Referring to FIG. 6C, an intra prediction mode of an above or left block (mode 18 shown with a double solid arrow), its immediate mode to the left (mode 19 shown with a double dotted line arrow), its immediate mode to the right (mode 17 shown with a double dotted line arrow) and its second immediate mode to the right (mode 16 shown with a double dotted line arrow) are included in the most probable mode list for only the MRL intra prediction.

Figure 6D:
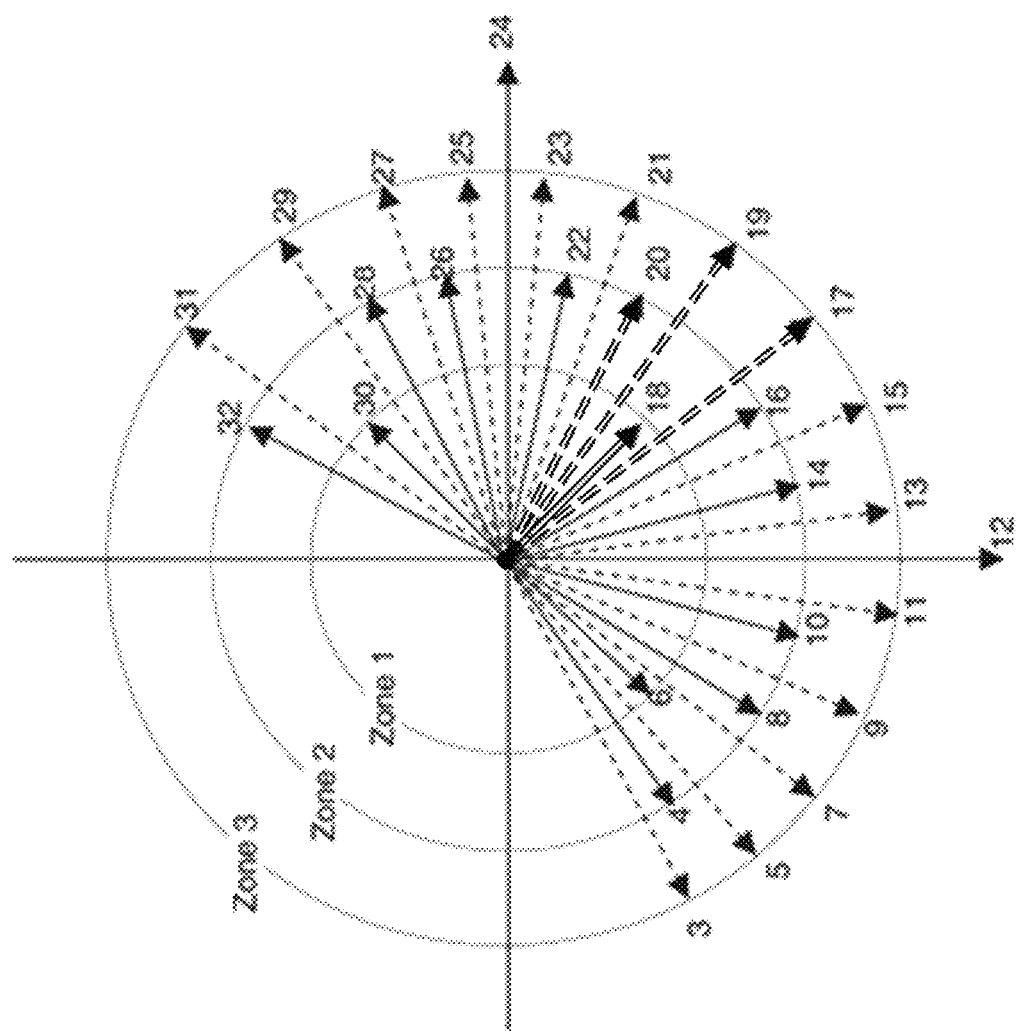

FIG. 6D is a diagram of four Non-L0MPMs including an available angular mode and its immediate modes, according to embodiments.

Referring to FIG. 6D, an intra prediction mode of an above or left block (mode 18 shown with a double solid arrow), its immediate mode to the left (mode 19 shown with a double dotted line arrow), its immediate mode to the right (mode 17 shown with a double dotted line arrow) and its second immediate mode to the left (mode 20 shown with a double dotted line arrow) are included in the most probable mode list for only the MRL intra prediction.

In embodiments, when intra prediction modes of above and left neighboring blocks are two different angular modes, and their intersection angle is less than 90 degrees, only modes having indices/directions that are located in a range of $[M_{min}, M_{max}]$ may be included in the most probable mode list for only MRL intra prediction. $M_{min}$, $M_{max}$ respectively denote a minimum and a maximum of intra prediction mode indices of the above and left neighboring blocks, as described below.

Figure 6E:
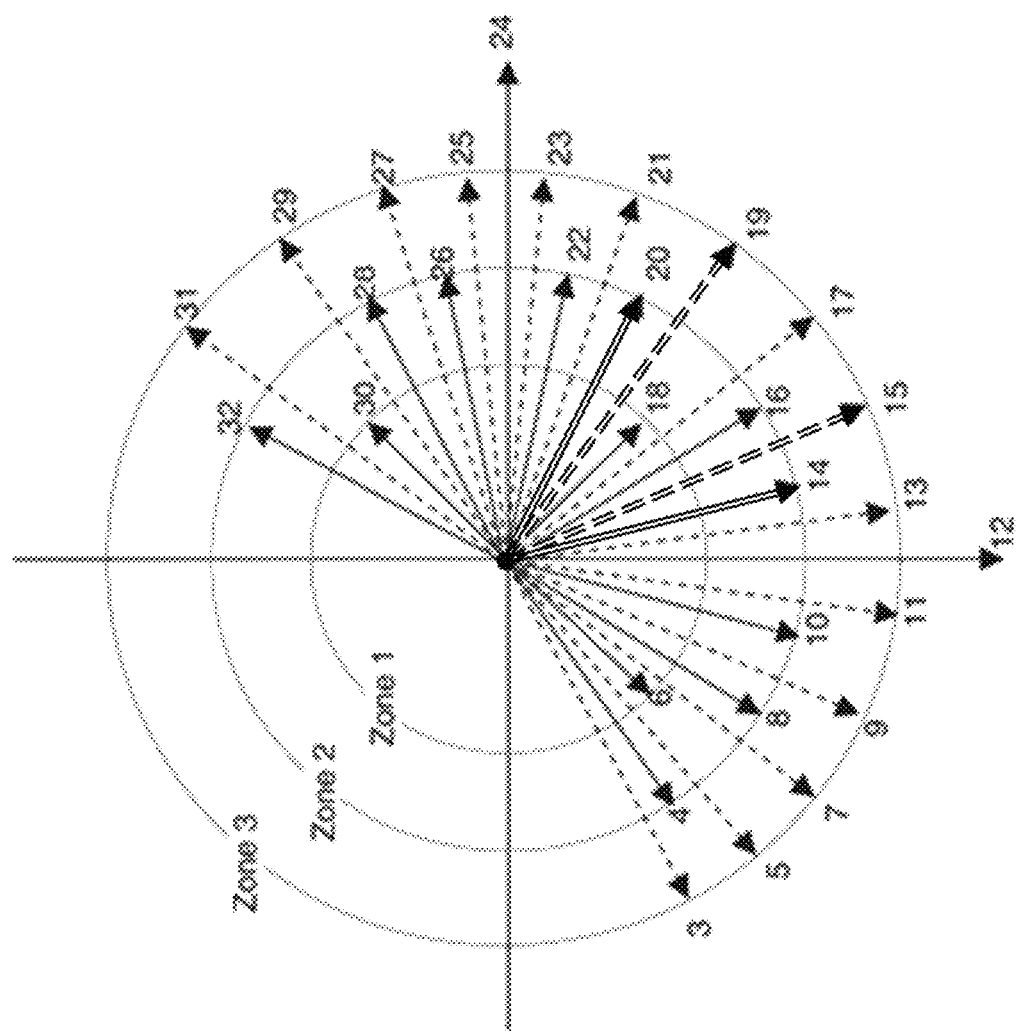
FIGS. 6E, 6F, 6G and 6H are diagrams of four Non-L0MPMs including available angular modes and their immediate modes, according to embodiments.

FIG. 6E is a diagram of four Non-L0MPMs including available angular modes and their immediate modes, according to embodiments.

Referring to FIG. 6E, an intra prediction mode of a left block $M_L$, an intra prediction modes of an above block $M_A$, and two immediate modes with indices between $M_A$ and $M_L$ are included in the most probable mode list for only the MRL intra prediction. In detail, when the intra prediction mode of the left block $M_L$ is 14 (double solid line arrow), and the intra prediction mode of the above block $M_A$ is 20 (double solid line arrow), the Non-L0MPMs include modes 14, 20, 15 (double dotted line arrow) and 19 (double dotted line arrow).

In embodiments, when intra prediction modes of above and left neighboring blocks are two different angular mode, and their intersection angle is greater than 90 degrees, only modes having indices/directions that are between $D_L$ and $D'_A$ or between $D'_L$ and $D_A$ may be included in the most probable mode list for only MRL intra prediction. $D_A$, $D_L$, $D'_A$, respectively denote directions of the intra prediction modes of the above and left neighboring blocks, and opposite directions of intra prediction modes of the above and left neighboring blocks, as described below.

Figure 6F:
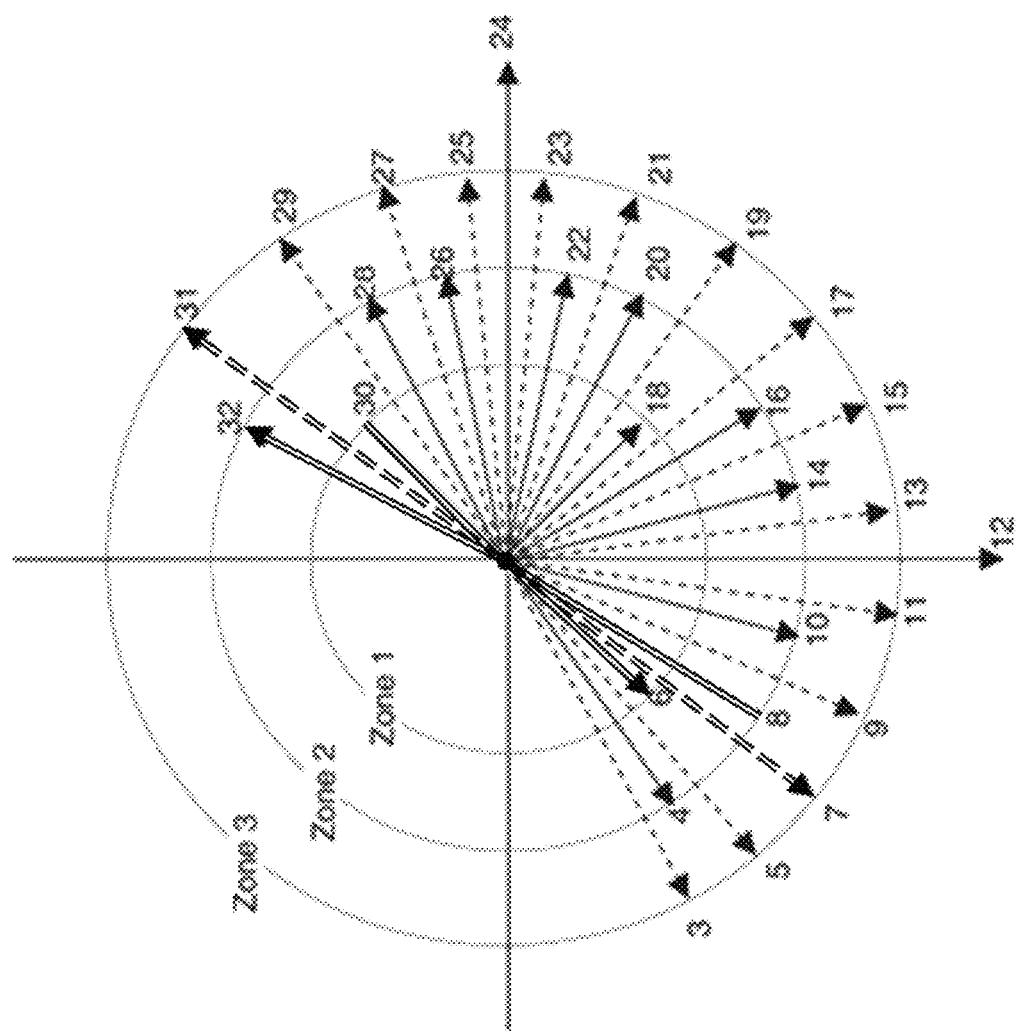

FIG. 6F is a diagram of four Non-L0MPMs including available angular modes and their immediate modes, according to embodiments.

Referring to FIG. 6F, an intra prediction mode of a left block having a direction $D_L$, an intra prediction mode of an above block having a direction $D_A$, and two immediate modes having directions between $D_L$ and $D'_A$ or between $D'_L$ and $D_A$ are included in the most probable mode list for only the MRL intra prediction. In detail, when the intra prediction mode of the left block is 6 (double solid line arrow), and the intra prediction mode of the above block is 32 (double solid line arrow), the Non-L0MPMs include 6, 32, 7 (double dotted line arrow), 31 (double dotted line arrow).

Figure 6G:
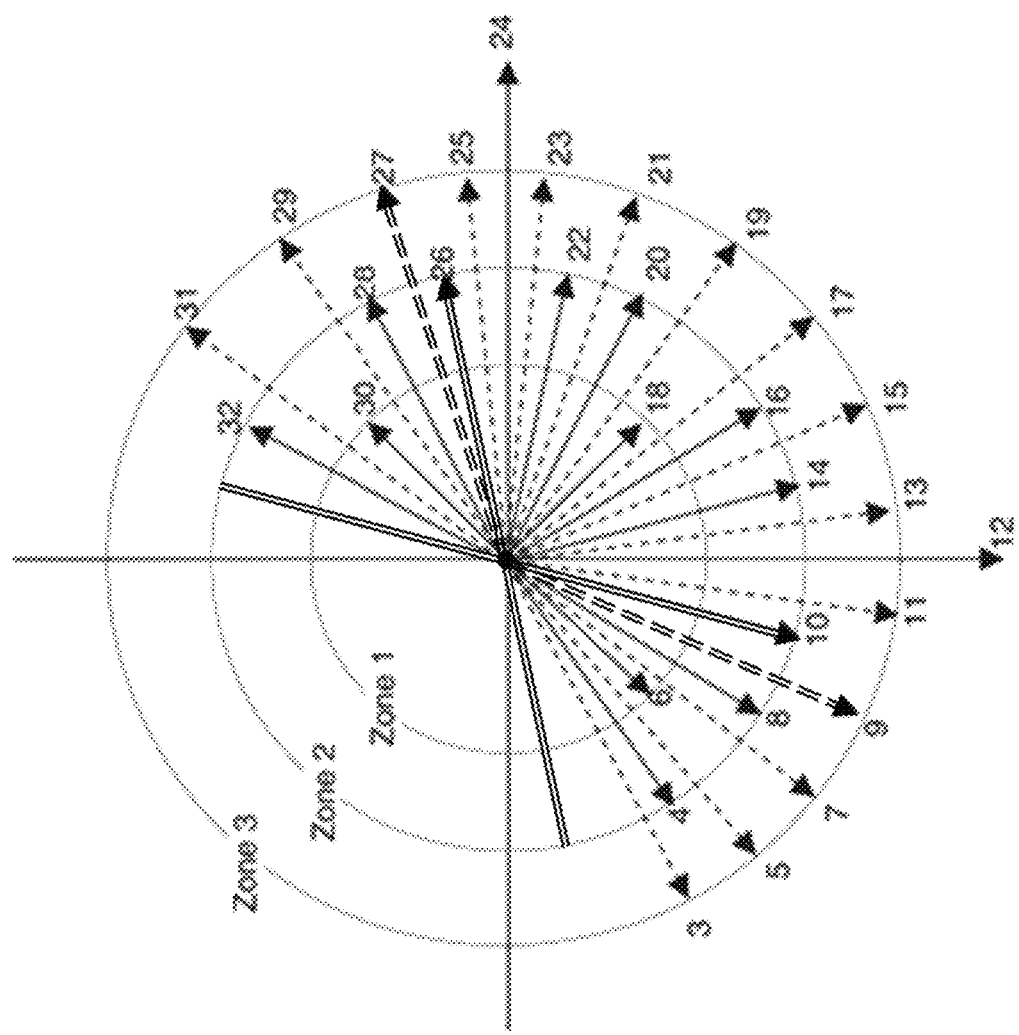

FIG. 6G is a diagram of four Non-L0MPMs including available angular modes and their immediate modes, according to embodiments.

Referring to FIG. 6G, an intra prediction mode of a left block having a direction $D_L$, an intra prediction mode of an above block having a direction $D_A$, and two immediate modes having directions between $D_L$ and $D'_A$ or between $D'_L$ and $D_A$ are included in the most probable mode list for only the MRL intra prediction. In detail, when the intra prediction mode of the left block is 10 (double solid line arrow), and the intra prediction mode of the above block is 26 (double solid line arrow), the Non-L0MPMs include 10, 26, 9 (double dotted line arrow), 27 (double dotted line arrow).

In the above embodiments, if a neighboring intra prediction mode is one of furthest angular modes (with minimum and maximum indices among all angular modes), and its immediate mode cannot be found, an immediate mode of an opposite direction to the neighboring intra prediction mode is instead included in the most probable mode list for only the MRL intra prediction, as described below.

Figure 6H:
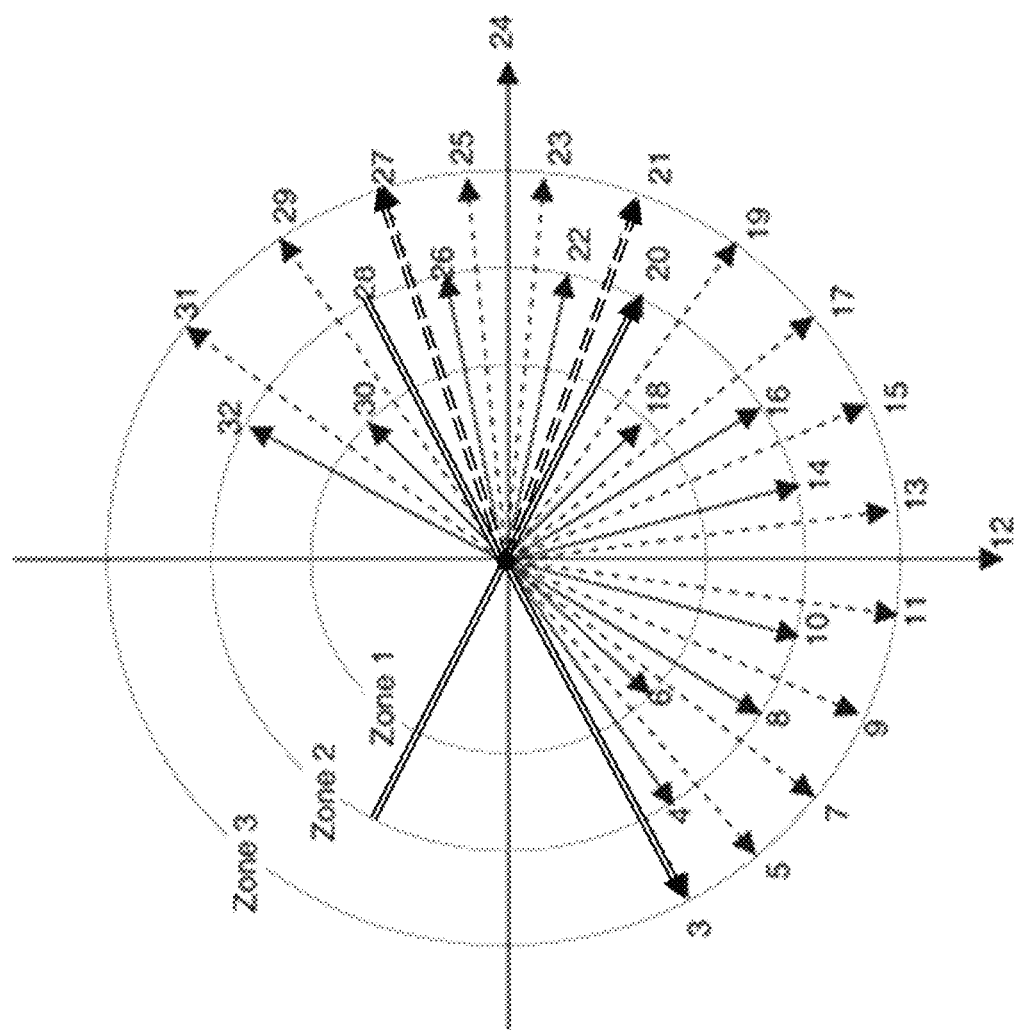

FIG. 6H is a diagram of four Non-L0MPMs including available angular modes and their immediate modes, according to embodiments.

Referring to FIG. 6H, for example, when an intra prediction mode of a left block is 3 (double solid line arrow), and an intra prediction mode of an above block is 20 (double solid line arrow), the Non-L0MPMs include 3, 20, 27 (double dotted line arrow), 21 (double dotted line arrow). In addition, a redundancy mode in the Non-L0MPMs will be excluded, and other modes are included in the Non-L0MPMs, in a similar way as FIGS. 6C and 6D.

FIG. 7 is a flowchart illustrating a method (700) of controlling intra prediction for decoding or encoding of a video sequence, according to embodiments. In some implementations, one or more process blocks of FIG. 7 may be performed by the decoder (310). In some implementations, one or more process blocks of FIG. 7 may be performed by another device or a group of devices separate from or including the decoder (310), such as the encoder (303).

Referring to FIG. 7, in a first block (710), the method (700) includes identifying whether a first intra prediction mode of an above neighboring block of a prediction block is different than a second intra prediction mode of a left neighboring block of the prediction block.

Based on the first intra prediction mode being identified to be not different than the second intra prediction mode (710-No), in a second block (720), the method (700) includes obtaining a most probable mode (MPM) list including the first intra prediction mode, first immediate modes immediate to the first intra prediction mode and one among second immediate modes respectively immediate to the first immediate modes.

In a third block (730), the method (700) includes performing the intra prediction on multiple reference lines of the prediction block, using the obtained MPM list, the multiple reference lines being without a first reference line closest to the prediction block.

Based on the first intra prediction mode being identified to be different than the second intra prediction mode (710-Yes), in a fourth block (740), the method (700) includes identifying whether an intersection angle between the first intra prediction mode and the second intra prediction mode is less than 90 degrees.

Based on the intersection angle being identified to be less than 90 degrees (740-Yes), in a fifth block (750), the method (700) includes obtaining the MPM list including the first intra prediction mode, the second intra prediction mode and third immediate modes having a plurality of indices between minimum and maximum indices among the first intra prediction mode and the second intra prediction mode.

Based on the intersection angle being identified to be greater than 90 degrees (740-No), in a sixth block (760), the method (700) includes obtaining the MPM list including the first intra prediction mode, the second intra prediction mode and third immediate modes having a plurality of directions between a first direction of the second intra prediction mode and a second direction opposite to a third direction of the first intra prediction mode.

The method (700) may further include, based on the intersection angle being identified to be greater than 90 degrees, obtaining the MPM list including the first intra prediction mode, the second intra prediction mode and third immediate modes having a plurality of directions between a first direction opposite to a second direction of the second intra prediction mode and a third direction of the first intra prediction mode.

The obtaining the MPM list may include, based on the first intra prediction mode having one among minimum and maximum indices among all of intra prediction modes, obtaining, as one among the first immediate modes, an immediate mode immediate to an opposite direction of the first intra prediction mode.

The identifying whether the first intra prediction mode is different than the second intra prediction mode may include identifying whether one among the first intra prediction mode and the second intra prediction mode is not coded or non-angular. The obtaining the MPM list may include, based on one among the first intra prediction mode and the second intra prediction mode being identified to be not coded or non-angular, obtaining the MPM list including a plurality of intra prediction modes respectively having a vertical direction, a horizontal direction and diagonal directions.

Although FIG. 7 shows example blocks of the method (700), in some implementations, the method (700) may include additional blocks, fewer blocks, different blocks, or differently arranged blocks than those depicted in FIG. 7. Additionally, or alternatively, two or more of the blocks of the method (700) may be performed in parallel.

Further, the proposed methods may be implemented by processing circuitry (e.g., one or more processors or one or more integrated circuits). In an example, the one or more processors execute a program that is stored in a non-transitory computer-readable medium to perform one or more of the proposed methods.

Figure 8:
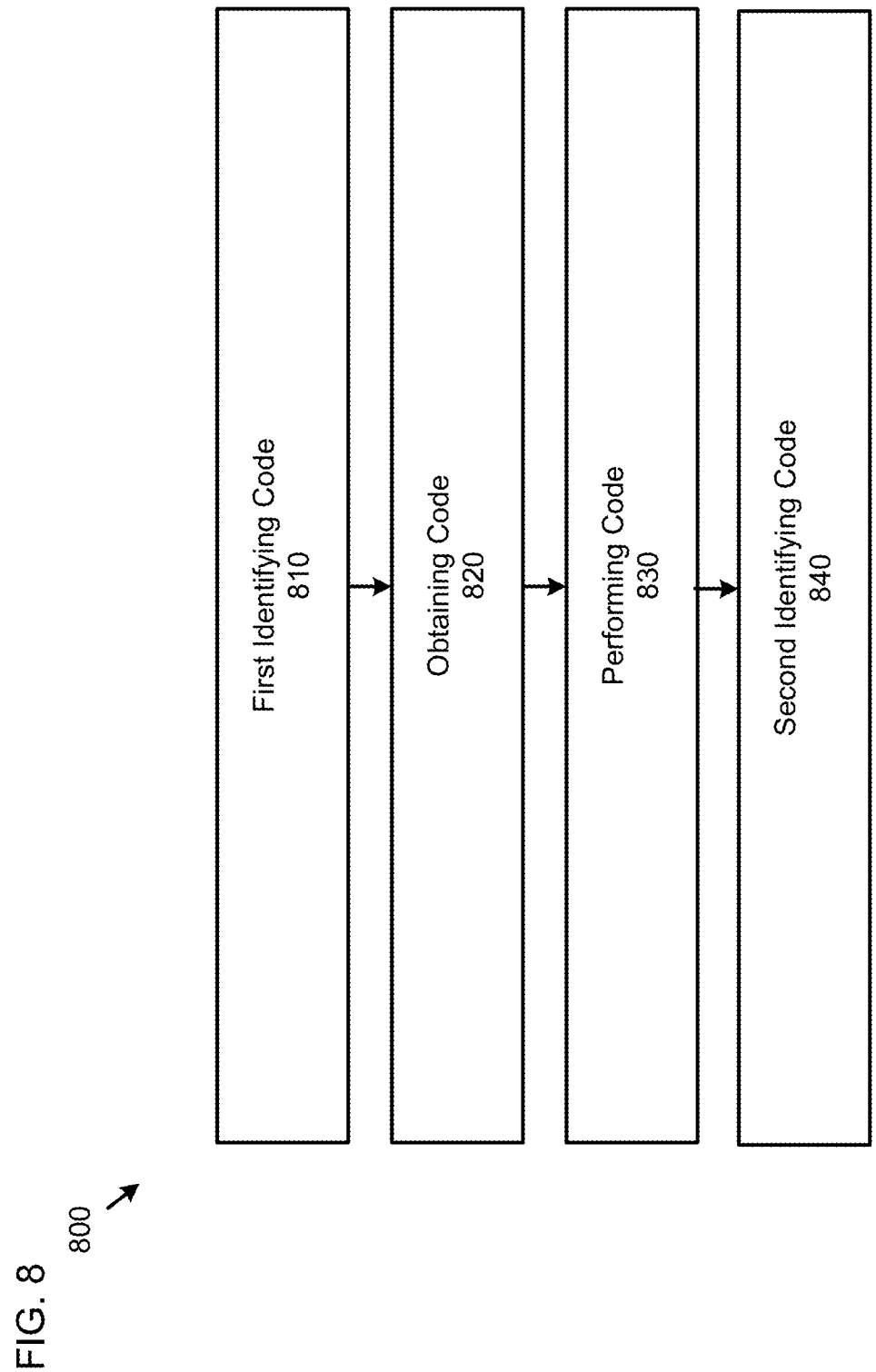
FIG. 8 is a simplified block diagram of an apparatus for controlling intra prediction for decoding or encoding of a video sequence, according to embodiments.

FIG. 8 is a simplified block diagram of an apparatus (800) for controlling intra prediction for decoding or encoding of a video sequence, according to embodiments.

Referring to FIG. 8, the apparatus (800) includes first identifying code (810), obtaining code (820), performing code (830) and second identifying code (840).

The first identifying code (810) is configured to cause the at least one processor to identify whether a first intra prediction mode of an above neighboring block of a prediction block is different than a second intra prediction mode of a left neighboring block of the prediction block.

The obtaining code (820) is configured to cause the at least one processor to, based on the first intra prediction mode being identified to be not different than the second intra prediction mode, obtain a most probable mode (MPM) list including the first intra prediction mode, first immediate modes immediate to the first intra prediction mode and one among second immediate modes respectively immediate to the first immediate modes.

The performing code (830) is configured to cause the at least one processor to perform the intra prediction on multiple reference lines of the prediction block, using the obtained MPM list, the multiple reference lines being without a first reference line closest to the prediction block.

The second identifying code (840) is configured to cause the at least one processor to, based on the first intra prediction mode being identified to be different than the second intra prediction mode, identify whether an intersection angle between the first intra prediction mode and the second intra prediction mode is less than 90 degrees.

The obtaining code (820) is further configured to cause the at least one processor to, based on the intersection angle being identified to be less than 90 degrees, obtain the MPM list including the first intra prediction mode, the second intra prediction mode and third immediate modes having a plurality of indices between minimum and maximum indices among the first intra prediction mode and the second intra prediction mode.

The obtaining code (820) is further configured to cause the at least one processor to, based on the intersection angle being identified to be greater than 90 degrees, obtain the MPM list including the first intra prediction mode, the second intra prediction mode and third immediate modes having a plurality of directions between a first direction of the second intra prediction mode and a second direction opposite to a third direction of the first intra prediction mode.

The obtaining code (820) is further configured to cause the at least one processor to, based on the intersection angle being identified to be greater than 90 degrees, obtain the MPM list including the first intra prediction mode, the second intra prediction mode and third immediate modes having a plurality of directions between a first direction opposite to a second direction of the second intra prediction mode and a third direction of the first intra prediction mode.

The obtaining code (820) is further configured to cause the at least one processor to, based on the first intra prediction mode having one among minimum and maximum indices among all of intra prediction modes, obtain, as one among the first immediate modes, an immediate mode immediate to an opposite direction of the first intra prediction mode.

The first identifying code (810) is further configured to cause the at least one processor to identify whether one among the first intra prediction mode and the second intra prediction mode is not coded or non-angular. The obtaining code (820) is further configured to cause the at least one processor to, based on one among the first intra prediction mode and the second intra prediction mode being identified to be not coded or non-angular, obtain the MPM list including a plurality of intra prediction modes respectively having a vertical direction, a horizontal direction and diagonal directions.

The techniques described above, can be implemented as computer software using computer-readable instructions and physically stored in one or more computer-readable media.

FIG. 9 is a diagram of a computer system (900) suitable for implementing embodiments.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system (900) are examples in nature and are not intended to suggest any limitation as to the scope of use or functionality of the computer software implementing embodiments. Neither should the configuration of components be interpreted as having any dependency or requirement relating to any one or combination of components illustrated in the embodiment of a computer system (900).

Computer system (900) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (901), mouse (902), trackpad (903), touch screen (910), data-glove, joystick (905), microphone (906), scanner (907), camera (908).

Computer system (900) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (910), data-glove, or joystick (905), but there can also be tactile feedback devices that do not serve as input devices), audio output devices (such as: speakers (909), headphones (not depicted)), visual output devices (such as screens (910) to include cathode ray tube (CRT) screens, liquid-crystal display (LCD) screens, plasma screens, organic light-emitting diode (OLED) screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted). A graphics adapter (950) generates and outputs images to the touch-screen (910).

Computer system (900) can also include human accessible storage devices and their associated media such as optical media including CD/DVD ROM/RW (920) with CD/DVD or the like media (921), thumb-drive (922), removable hard drive or solid state drive (923), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (900) can also include interface(s) to one or more communication networks (955). Networks (955) can for example be wireless, wireline, optical. Networks (955) can further be local, wide-area, metropolitan, vehicular and industrial, real-time, delay-tolerant, and so on. Examples of networks (955) include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks (955) commonly require external network interface adapters that attached to certain general purpose data ports or peripheral buses (949) (such as, for example universal serial bus (USB) ports of the computer system (900); others are commonly integrated into the core of the computer system (900) by attachment to a system bus as described below (for example Ethernet interface into a PC computer system or cellular network interface (954) into a smartphone computer system). Using any of these networks (955), computer system (900) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks (955) and network interfaces (954) as described above.

Aforementioned human interface devices, human-accessible storage devices, and network interfaces (954) can be attached to a core (940) of the computer system (900).

The core (940) can include one or more Central Processing Units (CPU) (941), Graphics Processing Units (GPU) (942), specialized programmable processing units in the form of Field Programmable Gate Areas (FPGA) (943), hardware accelerators (944) for certain tasks, and so forth. These devices, along with Read-only memory (ROM) (945), Random-access memory (RAM) (946), internal mass storage such as internal non-user accessible hard drives, solid-state drives (SSDs), and the like (947), may be connected through a system bus (948). In some computer systems, the system bus (948) can be accessible in the form of one or more physical plugs to enable extensions by additional CPUs, GPU, and the like. The peripheral devices can be attached either directly to the core's system bus (948), or through a peripheral bus (949). Architectures for a peripheral bus include peripheral component interconnect (PCI), USB, and the like.

CPUs (941), GPUs (942), FPGAs (943), and accelerators (944) can execute certain instructions that, in combination, can make up the aforementioned computer code. That computer code can be stored in ROM (945) or RAM (946). Transitional data can also be stored in RAM (946), whereas permanent data can be stored for example, in the internal mass storage (947). Fast storage and retrieve to any of the memory devices can be enabled through the use of cache memory, that can be closely associated with one or more CPU (941), GPU (942), mass storage (947), ROM (945), RAM (946), and the like.

The computer readable media can have computer code thereon for performing various computer-implemented operations. The media and computer code can be those specially designed and constructed for the purposes of embodiments, or they can be of the kind well known and available to those having skill in the computer software arts.

As an example and not by way of limitation, the computer system having architecture (900), and specifically the core (940) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (940) that are of non-transitory nature, such as core-internal mass storage (947) or ROM (945). The software implementing various embodiments can be stored in such devices and executed by core (940). A computer-readable medium can include one or more memory devices or chips, according to particular needs. The software can cause the core (940) and specifically the processors therein (including CPU, GPU, FPGA, and the like) to execute particular processes or particular parts of particular processes described herein, including defining data structures stored in RAM (946) and modifying such data structures according to the processes defined by the software. In addition or as an alternative, the computer system can provide functionality as a result of logic hardwired or otherwise embodied in a circuit (for example: accelerator (944)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. Embodiments encompass any suitable combination of hardware and software.

While this disclosure has described several embodiments, there are alterations, permutations, and various substitute equivalents, which fall within the scope of the disclosure. It will thus be appreciated that those skilled in the art will be able to devise numerous systems and methods that, although not explicitly shown or described herein, embody the principles of the disclosure and are thus within the spirit and scope thereof.

The invention claimed is:

1. A method of controlling intra prediction for decoding or encoding of a video sequence, the method being performed by at least one processor, and the method comprising:
    identifying whether a first intra prediction mode of an above neighboring block of a prediction block is different than a second intra prediction mode of a left neighboring block of the prediction block, the first intra prediction mode and the second prediction mode excluding DC and planar modes;
    based on the first intra prediction mode being identified to be not different than the second intra prediction mode, obtaining a most probable mode (MPM) list comprising the first intra prediction mode, first immediate modes immediate to the first intra prediction mode and one among second immediate modes respectively immediate to the first immediate modes;
    based on the first intra prediction mode being identified to be different than the second intra prediction mode, identifying whether an intersection angle between the first intra prediction mode and the second intra prediction modes is less than 90 degrees; and
    performing the intra prediction on multiple reference lines of the prediction block, using the obtained MPM list, the multiple reference lines being without a first reference line closest to the prediction block.

2. The method of claim 1, further comprising, based on the intersection angle being identified to be less than 90 degrees, obtaining the MPM list comprising the first intra prediction mode, the second intra prediction mode and third immediate modes having a plurality of indices between minimum and maximum indices among a first index of the first intra prediction mode and a second index of the second intra prediction mode.

3. The method of claim 1, further comprising, based on the intersection angle being identified to not be less than 90 degrees, obtaining the MPM list comprising the first intra prediction mode, the second intra prediction mode and third immediate modes having a plurality of directions between a direction of the second intra prediction mode and a direction opposite to a direction of the first intra prediction mode.

4. The method of claim 1, further comprising, based on the intersection angle being identified to not be less than 90 degrees, obtaining the MPM list comprising the first intra prediction mode, the second intra prediction mode and third immediate modes having a plurality of directions between a direction opposite to a direction of the second intra prediction mode and a direction of the first intra prediction mode.

5. The method of claim 1, wherein the obtaining the MPM list comprises, based on the first intra prediction mode having one among minimum and maximum indices among all of intra prediction modes, obtaining, as one among the first immediate modes, an immediate mode having a direction immediate to a direction opposite to a direction of the first intra prediction mode.

6. An apparatus for controlling intra prediction for decoding or encoding of a video sequence, the apparatus comprising:
    at least one memory configured to store computer program code; and
    at least one processor configured to access the at least one memory and operate according to the computer program code, the computer program code comprising:
        first identifying code configured to cause the at least one processor to identify whether a first intra prediction mode of an above neighboring block of a prediction block is different than a second intra prediction mode of a left neighboring block of the prediction block, the first intra prediction mode and the second intra prediction mode excluding DC and planar modes;
        obtaining code configured to cause the at least one processor to, based on the first intra prediction mode being identified to be not different than the second intra prediction mode, obtain a most probable mode (MPM) list comprising the first intra prediction mode, first immediate modes immediate to the first intra prediction mode and one among second immediate modes respectively immediate to the first immediate modes;
        second identifying code configured to cause the at least one processor to, based on the first intra prediction mode being identified to be different than the second intra prediction mode, identify whether an intersection angle between the first intra prediction mode and the second intra prediction mode is less than 90 degrees; and
        performing code configured to cause the at least one processor to perform the intra prediction on multiple reference lines of the prediction block, using the obtained MPM list, the multiple reference lines being without a first reference line closest to the prediction block.

7. The apparatus of claim 6, wherein the obtaining code is further configured to cause the at least one processor to, based on the intersection angle being identified to be less than 90 degrees, obtain the MPM list comprising the first intra prediction mode, the second intra prediction mode and third immediate modes having a plurality of indices between minimum and maximum indices among a first index of the first intra prediction mode and a second index of the second intra prediction mode.

8. The apparatus of claim 6, wherein the obtaining code is further configured to cause the at least one processor to, based on the intersection angle being identified to not be less than 90 degrees, obtain the MPM list comprising the first intra prediction mode, the second intra prediction mode and third immediate modes having a plurality of directions between a direction of the second intra prediction mode and a direction opposite to a direction of the first intra prediction mode.

9. The apparatus of claim 6, wherein the obtaining code is further configured to cause the at least one processor to, based on the intersection angle being identified to not be less than 90 degrees, obtain the MPM list comprising the first intra prediction mode, the second intra prediction mode and third immediate modes having a plurality of directions between a direction opposite to a direction of the second intra prediction mode and a direction of the first intra prediction mode.

10. The apparatus of claim 6, wherein the obtaining code is further configured to cause the at least one processor to, based on the first intra prediction mode having one among minimum and maximum indices among all of intra prediction modes, obtain, as one among the first immediate modes, an immediate mode having a direction immediate to a direction opposite to a direction of the first intra prediction mode.

11. A non-transitory computer-readable storage medium storing instructions that cause at least one processor to:
   identify whether a first intra prediction mode of an above neighboring block of a prediction block is different than a second intra prediction mode of a left neighboring block of the prediction block, the first intra prediction mode and the second intra prediction mode excluding DC and planar modes;
   based on the first intra prediction mode being identified to be not different than the second intra prediction mode, obtain a most probable mode (MPM) list comprising the first intra prediction mode, first immediate modes immediate to the first intra prediction mode and one among second immediate modes respectively immediate to the first immediate modes;
   based on the first intra prediction mode being identified to be different than the second intra prediction mode, identifying whether an intersection angle between the first intra prediction mode and the second intra prediction mode is less than 90 degrees; and
   perform intra prediction on multiple reference lines of the prediction block, using the obtained MPM list, the multiple reference lines being without a first reference line closest to the prediction block.

12. The non-transitory computer-readable storage medium of claim 11, wherein the instructions further cause the at least one processor to, based on the intersection angle being identified to be less than 90 degrees, obtain the MPM list comprising the first intra prediction mode, the second intra prediction mode and third immediate modes having a plurality of indices between minimum and maximum indices among a first index of the first intra prediction mode and a second index of the second intra prediction mode.

13. The non-transitory computer-readable storage medium of claim 11, wherein the instructions further cause the at least one processor to, based on the intersection angle being identified to not be less than 90 degrees, obtain the MPM list comprising the first intra prediction mode, the second intra prediction mode and third immediate modes having a plurality of directions between a direction of the second intra prediction mode and a direction opposite to a direction of the first intra prediction mode.

14. The non-transitory computer-readable storage medium of claim 11, wherein the instructions further cause the at least one processor to, based on the intersection angle being identified to not be less than 90 degrees, obtain the MPM list comprising the first intra prediction mode, the second intra prediction mode and third immediate modes having a plurality of directions between a direction opposite to a direction of the second intra prediction mode and a direction of the first intra prediction mode.

15. The non-transitory computer-readable storage medium of claim 11, wherein the instructions further cause the at least one processor to, based on the first intra prediction mode having one among minimum and maximum indices among all of intra prediction modes, obtain, as one among the first immediate modes, an immediate mode having a direction immediate to a direction opposite to a direction of the first intra prediction mode.

* * * * *